Aug. 3, 1937.  H. A. SATTERLEE  2,088,613
METHOD AND APPARATUS FOR THE MEASUREMENT OF ROTATIONAL VELOCITIES
Filed Jan. 9, 1935  2 Sheets-Sheet 1
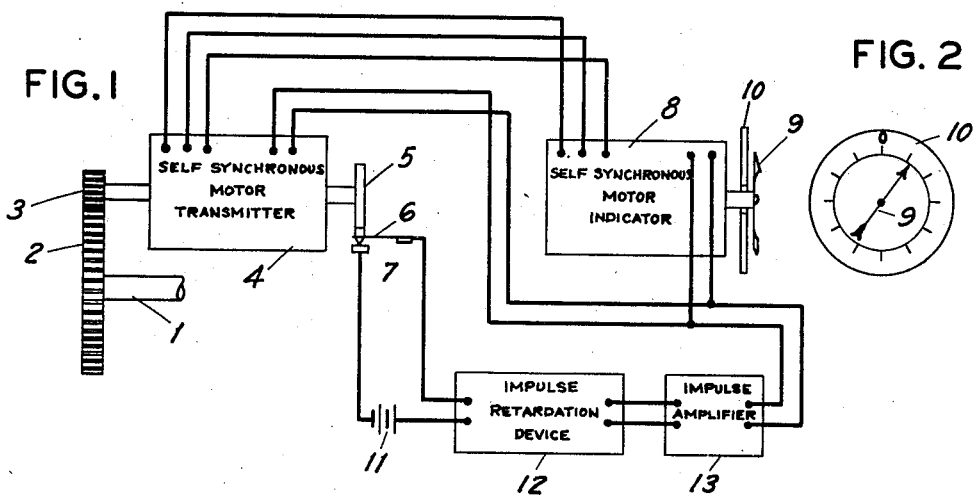
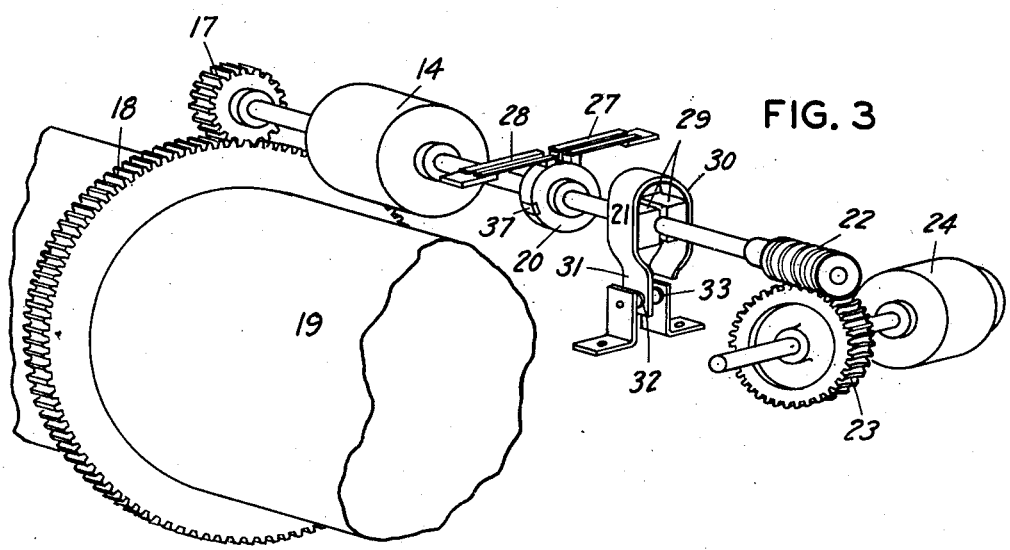
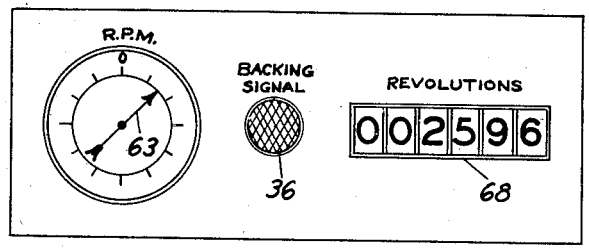
INVENTOR
*Howard Avery Satterlee*
BY
ATTORNEY Aug. 3, 1937.   H. A. SATTERLEE   2,088,613
METHOD AND APPARATUS FOR THE MEASUREMENT OF ROTATIONAL VELOCITIES
Filed Jan. 9, 1935   2 Sheets—Sheet 2

INVENTOR
HOWARD AVERY SATTERLEE
BY
ATTORNEY

Patented Aug. 3, 1937

2,088,613

UNITED STATES PATENT OFFICE 2,088,613

METHOD AND APPARATUS FOR THE MEASUREMENT OF ROTATIONAL VELOCITIES

Howard Avery Satterlee, Sharon, Mass., assignor to Submarine Signal Company, Boston, Mass., a corporation of Maine Application January 9, 1935, Serial No. 1,032

15 Claims. (Cl. 175—183)

The present invention relates in general to methods and apparatus for translating a rotational velocity into a proportional angular displacement and also to the application of such methods and apparatus for indicating at a remote point a variable displacement occurring at a proximate point.

The present invention provides particularly a method and apparatus for measuring and indicating the velocity of a rotating shaft and has especial application to instances where considerable accuracy is required such as in the indication of the speed of propeller shafts on ships.

In my prior copending application, Serial No. 721,334 filed April 19, 1934, I have described a system for measuring and indicating the velocity of a rotating shaft substantially instantaneously. In general the method described in that application comprises rotating an index at a rate proportional to the velocity to be measured and indicating the angle through which the index moves during a predetermined constant time interval.

According to the present invention, a substantially instantaneous indication is likewise obtained with the further advantage that the indication is entirely continuous and is produced by means of a stationary index. In addition to providing a new system for measuring the speed of a rotating shaft, or the like, the present invention also provides a new system for obtaining an indication of the average speed of two shafts and a new method of operating self-synchronous motors.

Figure 4:
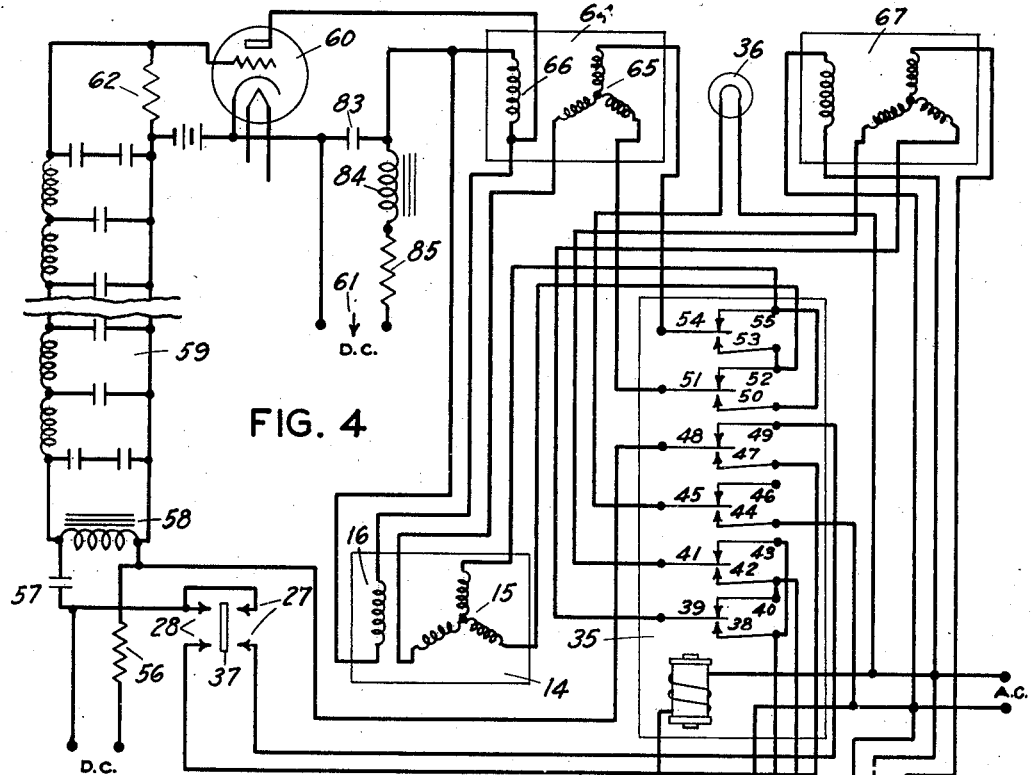
Figure 6:
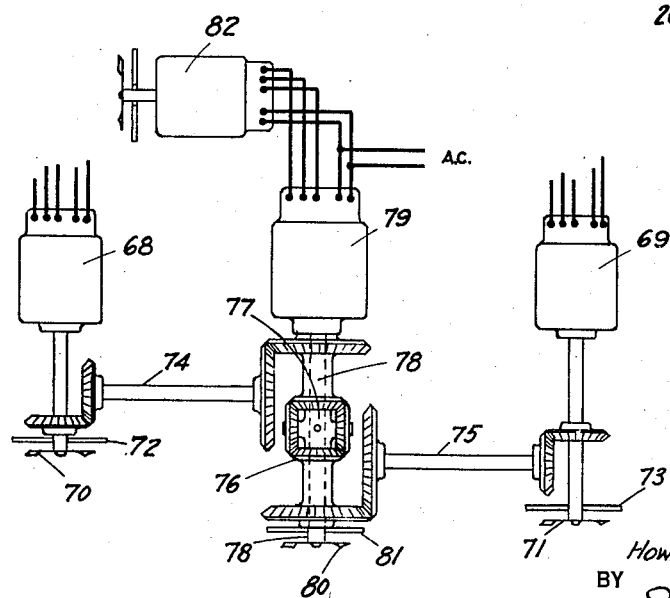

Other features of the invention as well as the manner in which it may be carried out will be understood from the following description and the accompanying drawings in which Figure 1 indicates schematically the application of my invention to the measurement of the speed of a rotating shaft; Figure 2 shows a front view of the indicating dial shown in Figure 1; Figure 3 is a perspective view of the transmitting apparatus according to my invention; Figure 4 is a wiring diagram of a complete shaft speed measuring system according to my invention including the transmitter shown in Figure 3; Figure 5 is a face view of the transmitter indicating panel associated with the apparatus shown in Figure 4 and Figure 6 shows an arrangement for obtaining an indication of the average speed of two rotating shafts.

In the following description and in the drawings the invention is described particularly as applied to propeller shaft speed indicating apparatus but it is to be understood that it may be applied to the measurement and indication of the speed of any rotating device or, generally speaking, to the translation of a rotational velocity or of a longitudinal or angular displacement into a proportional angular displacement, and that the invention is to be limited only as defined in the appended claims.

Figure 1 illustrates in a simple manner the application of my invention to a rotating shaft. The shaft 1 whose speed is to be measured is geared through a reduction gearing 2, 3 to the rotor of a self-synchronous transmitting motor 4. On the rotor shaft is also mounted a cam 5, serving to close contacts 6 and 7 once in each revolution of the rotor.

The self-synchronous motors referred to herein are provided in the customary manner with a polyphase winding and a relatively rotatable single phase winding. In Figure 1 the self-synchronous motor 4 is provided with a three phase connected winding and a single phase winding. It is immaterial which is the rotor and which is the stator, for these machines are built both ways and either will operate satisfactorily in the present systems.

The motor 4 has its windings connected in parallel respectively with the corresponding windings of a second self-synchronous motor 8, on the rotor shaft of which is mounted a pointer 9 associated with a scale 10. A face view of the pointer and scale is shown in Figure 2.

The contacts 6, 7 previously referred to are in series with a direct current source such as a battery 11. The closing of the contacts 6, 7 produces an electric impulse which is conducted through a device 12 which has been termed an impulse retardation device but might also be designated as being a path of known time length, thence to an amplifier 13 and thence to the parallel connected single phase windings of the two self-synchronous motors 4 and 8. The manner of operation of the system will now be evident.

The rotor of the transmitting motor 4 is continuously rotated at a speed proportional to the speed of the shaft 1. Once in each revolution of the rotor of motor 4, contacts 6, 7 are closed by the cam 5 producing an electric impulse, which after passing through a path of known time length, is impressed upon the parallel connected single phase windings of the motors 4 and 8. In other words, the electric impulse is impressed upon the motors a definite time interval after the production of the impulse. During this time interval the rotor of motor 4 will have turned through a certain angle depending upon the speed of the shaft 1.

The impulse, when it reaches the single phase windings of the motors 4 and 8, will produce in each case a magnetic field. In the motor 4, one of whose windings is in constant rotation, a voltage will be induced in the three phase winding, which voltage is impressed upon the corresponding winding of the motor 8. If, now, the three phase and single phase windings of the motor 8 do not occupy the same relative positions as those of motor 4, a torque will be produced in the former tending to move its rotor into such a corresponding position. Since the impulses are repeated in rapid succession and last for only a short time, the rotor of motor 8 will take a position which corresponds to the position of the rotor of motor 4 a definite predetermined time interval after the production of the impulse by the closing of contacts 6, 7.

Thus, the pointer 9 which is fixed or geared to the shaft of the rotor of motor 8 will indicate the position which the rotor of motor 4 occupied at a definite time interval after the production of the impulse. In other words, the pointer 9 will indicate the angular displacement of the rotor of motor 4 during a constant predetermined time interval. This displacement is proportional to the velocity and consequently, by properly calibrating the scale 10, the pointer may be made to indicate the velocity of rotation of the rotor of motor 4 or of shaft 1.

Should the speed of the shaft 1 change, the pointer 9 will likewise change its position. If we assume that the shaft 1 increases its speed, it will be evident that by the time a given impulse reaches the windings of the motors 4 and 8, the rotor of the former will have turned through a greater angle than previously and consequently sufficient torque will be developed in the motor 8 to produce a sufficient rotation of its rotor to bring it into the new position corresponding to that of the rotor of motor 4. It may happen sometimes that a single impulse is not sufficient to bring about a complete rotation of motor 8 into the new position, but a succession of several impulses will usually be sufficient.

In Figures 3, 4 and 5, the invention is shown as applied particularly to the indication of the speed of a propeller shaft. The system shown in these figures includes not only a speed indicating device but also a device to indicate the total revolutions of the shaft and to indicate the direction of its revolution.

The transmitting apparatus shown schematically in Figure 4 and in perspective in Figure 3 includes a self-synchronous motor 14 provided with a three phase winding 15 and a single phase winding 16 and having its rotor driven mechanically through suitable gearing 17, 18 by the propeller shaft 19 whose speed is to be indicated. On the same shaft with the rotor of motor 14 are mounted a commutator 20, a contact operating friction collar 21 and a gear wheel 22. The latter through gear 23 drives a self-synchronous motor 24 having the three phase winding 25 and a single phase winding 26. The commutator 20 together with the cooperating pairs of brushes 27 and 28 comprise the circuit closing mechanism for the production of the electric impulse.

The friction collar 21 comprises two blocks of wood 29 held against the shaft by means of a phosphor bronze spring member 30 with just sufficient friction to produce a small torque on the spring member so that its lower end 31 bearing the contact 32 will be moved to the left or to the right. Thus, when the shaft is rotating in one direction, that is counter-clockwise, the contacts 32, 33 will be closed, while if the shaft rotates clockwise the contacts will be opened. It is convenient to arrange the mechanism in such a manner that the contacts will be opened for the normal direction of operation of the propeller shaft 19.

The contacts 32, 33 are connected through a source of power with the winding of the magnet 34 of the double throw relay 35. This relay controls the reversing signal 36 and also causes current to flow through the motor windings in the proper direction to move the indicator in the same direction regardless of the direction of rotation of the shaft 19. With the contacts 32, 33 opened, which conforms let us say, to the forward direction of rotation of shaft 19, brushes 27 are active. On the other hand, with the contacts 32, 33 closed, the brushes 28 are active. Two sets of brushes are necessary in order that there will be no zero error in the indicator when the shaft reverses. These brushes are short-circuited by the commutator segment 37 and operate through the relay contacts 47, or 49 and 48 to connect the condenser 57, which has previously been charged from the D. C. source through resistance 56, across the choke 58.

The short-circuiting of contacts 27 (or 28) by commutator segment 37 permits the condenser 57 to discharge through the choke 58. The choke 58 is connected across the input to the electric retardation line 59 which has a definite predetermined constant time length. The output end of the retardation line 59 is connected across the line-matching resistor 62 and the grid and cathode of a gaseous discharge tube 60 whose anode circuit is supplied with potential from the source 61. The gaseous discharge tube 60 is preferably one which can supply a current of high intensity for very short periods of time.

The electric impulse produced by the discharge of condenser 57 when contacts 27 are short-circuited by the commutator passes through retardation line 59 and excites the grid of the gaseous discharge tube 60 by which it is greatly amplified. It will be noted that the anode of the tube receives its potential from the condenser 83 which is charged from the D. C. supply through resistance 85 and choke 84. The resistance 85 is made large enough to permit only a comparatively slow charging of the condenser 83, while the latter is small enough to discharge through the tube in a short time. This arrangement provides an anode circuit which will produce a current impulse of great intensity and short duration when the grid of the tube is made sufficiently positive to cause the discharge to take place. An impulse of short duration is necessary in order to prevent vibration of the indicator, since during the time the impulse lasts, the indicating motor will tend to follow the rotation of the transmitting motor and the beginning of the next impulse will tend to pull it back. Inasmuch as the impulse cannot be made of zero length, some vibration will always occur, but this can be minimized and be made substantially invisible by designing the rotor of the indicating motor to have a large moment of inertia.

The amplified impulse is impressed across the single phase winding 16 of the self-synchronous transmitting motor 14, which winding is in parallel with the corresponding winding 66 of the self-synchronous indicating motor 64. The three phase winding 65 of the motor 64 likewise is in parallel with the three phase winding 15 of the transmitting motor 14. The latter connection is made through contacts 50 to 55 of the relay 35 in such a manner that the magnetic field and the generated torque in the indicating motor will always be in the same direction regardless of the direction of the rotation of the rotor of the transmitting motor 14. The passage of the electric impulse through the parallel connected single phase windings 16 and 66 of the transmitting and indicating motors respectively produces a magnetic field in both motors at the same instant.

Unless the rotor and stator of the indicating motor 64 are in the same position with respect to each other as those of the motor 14, a current will flow in the three phase windings 15 and 65 and a torque will be developed causing the rotor of motor 64 to revolve a sufficient amount to bring it into the same relative position with respect to the motor poles as is occupied to the rotor of motor 14 with respect to its poles. If the rotors of the two motors should happen to be very much out of phase with each other, a single electric impulse produced by a discharge of tube 60 may not be of sufficient duration to produce enough torque in the motor 64 to bring its motor completely into phase with that of the motor 14. A few successive impulses will, however, usually be sufficient to cause the rotor of motor 64 to assume a position corresponding exactly to the position of the rotor of motor 14 at the instant the discharge of tube 60 took place. It will be obvious that no difficulty is caused hereby since the rate of rotation of the commutator 20 can be made large enough by suitable gearing to produce a considerable number of impulses in a given time interval even though the shaft 19 revolves comparatively slowly.

As shown in Figure 3, for example, the gears 18 and 17 are in the ratio of five to one whereby the commutator 20 moves five times as fast as the shaft 19 and consequently five electric impulses act upon the indicating motor 64 for each complete revolution of the shaft 19. The rotor of motor 64 is arranged to drive the pointer 63 associated with a suitable scale to indicate the revolutions per minute of the shaft 19 as shown in Figure 5. This completes the system for the measurement and indication of the speed of the shaft 19.

On shipboard it is, however, often advantageous for the navigator also to know the total number of revolutions of the propeller shaft. This is accomplished in my system in a simple manner. As indicated in Figure 3 the self-synchronous motor 24 is driven at a speed proportional to that of the propeller shaft 19. This motor has its windings connected to the corresponding windings of a similar self-synchronous motor 67 which is arranged to drive mechanically a revolution counter, the face of which is shown at 68 in Figure 5. The single phase parallel connected windings of the motors 24, 67 are supplied with alternating current of a suitable frequency, for example 60 cycles. The rotor of motor 67 will consequently rotate synchronously with that of motor 24 and if the gearing has been properly designed the indicator 68 will count the revolutions of the shaft 19.

It will be noted that I have shown only one indicating motor 64 for the speed indicating system. It will be evident, however, that any number of repeaters may be employed as may be desired. These will be entirely similar to the motor 64 and will likewise have their corresponding windings connected in parallel with those of the transmitting motor 14.

As is well known, many of the ships of today have more than one propeller shaft. In this case it is useful for the navigator to have a knowledge of the average speed of the two shafts. In Figure 6 I have shown a system for the indication of the average speed of two shafts. Two indicating self-synchronous motors 68 and 69 are each operated by a system such as that shown in Figure 4 and each indicates, by the position of its rotor with respect to a zero position, the speed of one of the propeller shafts. Thus, I have shown the pointers 70 and 71 mounted upon the shafts of the motors 68 and 69 and associated with the scales 72 and 73 respectively. The shafts of motors 68 and 69 drive through suitable gearing the shafts 74 and 75 which are connected to the differential gear assembly 76. The inner spider 77 of the differential gear system is fixed to the shaft 78 of a self-synchronous motor 79. Upon the shaft is also mounted a pointer 80 associated with a scale 81 whereby the indications of the average speed of the two shafts may be observed. The self-synchronous motor 79 has its windings connected in parallel with those of a similar motor 82, one set of windings being supplied with alternating current. The motor 82 will accordingly follow the motions of motor 79 and thus may be used as a repeater to give the average speed indications at a remote point. It should be noted that any suitable form of differential gearing may be employed, it being merely necessary to adjust the gear ratios in such a manner that the shaft 78 will at all times cause the pointer 80 to indicate a position which is the average of the positions of pointers 70 and 71.

It has been mentioned that the invention may be applied to the indication at a remote point of a variable displacement at a proximate point. In this case a transmitting self-synchronous motor is mechanically rotated through an angle proportional to the displacement in question and the indicating self-synchronous motor whose windings are connected in parallel with the corresponding windings of the transmitting motor is supplied at intervals, with unidirectional electric impulses of relatively large current intensity and short duration. The number of impulses per revolution of the transmitting motor depends largely upon the speed of the latter. If it normally turns slowly a larger number of impulses will be required than if it turns rapidly.

This arrangement may be generally applied to the operation of self-synchronous motors wherever it may be desired to have an indicating motor follow a transmitting motor. The use of short, high current unidirectional impulses in place of the conventional alternating current has a distinct advantage in providing much greater accuracy than was possible with the conventional arrangement heretofore used.

Having now described my invention, I claim:

1. A system for translating a rotational velocity into a proportional angular displacement comprising a self-synchronous transmitting motor and one or more self-synchronous indicating motors each of said motors having rotor and stator windings and having corresponding windings connected together in parallel, means for driving the transmitting motor at a speed proportional to said velocity, means for creating electric impulses synchronously with the passage of the rotor of the transmitting motor through a predetermined angular position, means for applying said impulses to one set of said connected windings a predetermined time interval after the creation of said impulses and means for indicating the angular position of said indicating motors.

2. A system for translating a rotational velocity into a proportional angular displacement comprising a self-synchronous transmitting motor and one or more self-synchronous indicating motors each of said motors having a polyphase and a single phase winding, one winding being on the rotor and the other on the stator, means for connecting said polyphase windings in parallel with each other, means for connecting said single phase windings in parallel with each other, means for driving the rotor of said transmitting motor at a speed proportional to said velocity, means for creating electric impulses synchronously with the passage of the rotor of said transmitting motor through a predetermined angular position, means for applying said impulses to said single phase windings a predetermined time interval after their creation and means for indicating the angular position of said indicating motors.

3. A system for indicating at a remote point, a variable displacement occurring at a proximate point comprising a self-synchronous motor positioned at each point each having rotor and stator windings and having corresponding windings connected together in parallel, means for angularly displacing the rotor of the motor at the proximate point proportionally to the displacement to be indicated, means for supplying periodically electric impulses of high current intensity and short duration to one set of said connected windings and means for indicating the angular position of the rotor of the motor at the remote point.

4. A system for indicating at a remote point a variable displacement occurring at a proximate point comprising a self-synchronous transmitting motor positioned at the proximate point and a self-synchronous indicating motor positioned at the remote point, each motor having a polyphase and a single phase winding, one winding being on the rotor and the other on the stator, means for connecting said polyphase windings in parallel with each other, means for connecting said single phase windings in parallel with each other, means for angularly displacing the rotor of the transmitting motor proportionally to the displacement to be indicated, means for supplying periodically electric impulses of high current intensity and short duration to said single phase windings, and means for indicating the angular position of the rotor of the indicating motor.

5. In a system for measuring the speed of a rotating shaft, a self-synchronous transmitting motor and a self-synchronous indicating motor each having single phase and polyphase windings, means for driving said transmitting motor from said shaft, means for producing an electric impulse at the instant of the passage of the rotor of said motor through a predetermined angular position, an electric transmission line having a predetermined time length, means for impressing said impulses on said line, means for connecting said polyphase windings together in parallel, means for connecting said single phase windings together in parallel, means for impressing said impulses after their passage through said line upon said single phase windings and means for indicating the angular position of the rotor of said indicating motor.

6. In a system for measuring the speed of a rotating shaft the combination of two or more parallel connected self-synchronous motors with means for exciting the same comprising means for producing a unidirectional electric impulse of short duration, a gaseous discharge tube having cathode grid and anode electrodes and attendant circuits, means for impressing said impulse upon said grid, means in the anode-cathode circuit of said tube adapted to supply anode potential of an intensity sufficient to produce a high current discharge in said anode-cathode circuit for a time interval of the same order of magnitude as the duration of said impulse and means for supplying said discharge current to said motors.

7. Apparatus according to claim 6 in which the means for producing the unidirectional electric impulse of short duration includes contacts adapted to be closed momentarily at intervals proportional to the rate of rotation of said shaft, a condenser and an inductance of relatively low value connected together in series and together in shunt with said contacts and a source of direct current connected through a series resistance of relatively high value also in shunt with said series connected condenser and inductance, whereby said condenser is charged slowly from said source and discharged rapidly through said inductance when said contacts are closed.

8. Apparatus according to claim 6 in which the means for supplying anode potential to said discharge tube comprises a condenser in shunt with a series circuit containing in series an inductance, a resistance and a source of direct current, said condenser being connected in series in said anode-cathode circuit and adapted to discharge through said tube when the latter becomes conductive.

9. A shaft speed measuring system including a transmitting self-synchronous motor driven by said shaft and one or more indicating self-synchronous motors connected in parallel with said transmitting motor, means for generating separate, successive, unidirectional electric impulses, means for supplying said impulses, each a definite constant time interval after its generation, to said motors and means responsive to the direction of rotation of said shaft for controlling the direction of rotation of said indicating motors.

10. A system for measuring the speed of a rotating shaft including a plurality of parallel connected self-synchronous motors one of which is driven by said shaft and means for supplying to said motors a succession of electric impulses each a predetermined time interval after said shaft passes through a definite angular position.

11. A system for measuring the speed of a rotating shaft including a plurality of parallel connected self-synchronous motors one of which is driven by said shaft and means including an electric retardation line for supplying to said motors a succession of electric impulses each a predetermined time interval after said shaft passes through a definite angular position.

12. In a speed indicating system the combination of means for producing electric impulses at a rate proportional to the said speed, an impulse delaying device, an impulse amplifier, a plurality of self-synchronous motors having their corresponding windings connected in parallel and one motor being mechanically driven at a rate proportional to said speed and means for conducting said impulses through said delaying device and said amplifier to said motors.

13. The combination of a plurality of self-synchronous motors having their corresponding windings connected together in parallel and means for periodically supplying said motors with unidirectional electric impulses of high current intensity and short duration.

14. A method of operating self-synchronous motors having their corresponding windings connected together in parallel respectively comprising supplying said motors periodically with a succession of separate unidirectional electric impulses of high current intensity and short duration.

15. The method of indicating the speed of rotation of a shaft which comprises mechanically driving a self-synchronous motor at a speed proportional to that of said shaft, periodically generating shaft unidirectional electric impulses in synchronism with the revolutions of said shaft, impressing said impulses after a definite constant time interval upon one winding of a second self-synchronous motor whose windings are connected in parallel with the corresponding windings of said first motor, and indicating the position of the rotor of said second motor.

HOWARD AVERY SATTERLEE.

CERTIFICATE OF CORRECTION.

Patent No. 2,088,613.                                                August 3, 1937.

HOWARD AVERY SATTERLEE.

It is hereby certified that error appears in the printed specification of the above numbered patent requiring correction as follows: Page 5, second column, line 7, claim 15, for the word "shaft" read short; and that the said Letters Patent should be read with this correction therein that the same may conform to the record of the case in the Patent Office.

Signed and sealed this 5th day of October, A. D. 1937.

Henry Van Arsdale

Acting Commissioner of Patents.

(Seal)